UNITED STATES PATENT OFFICE.

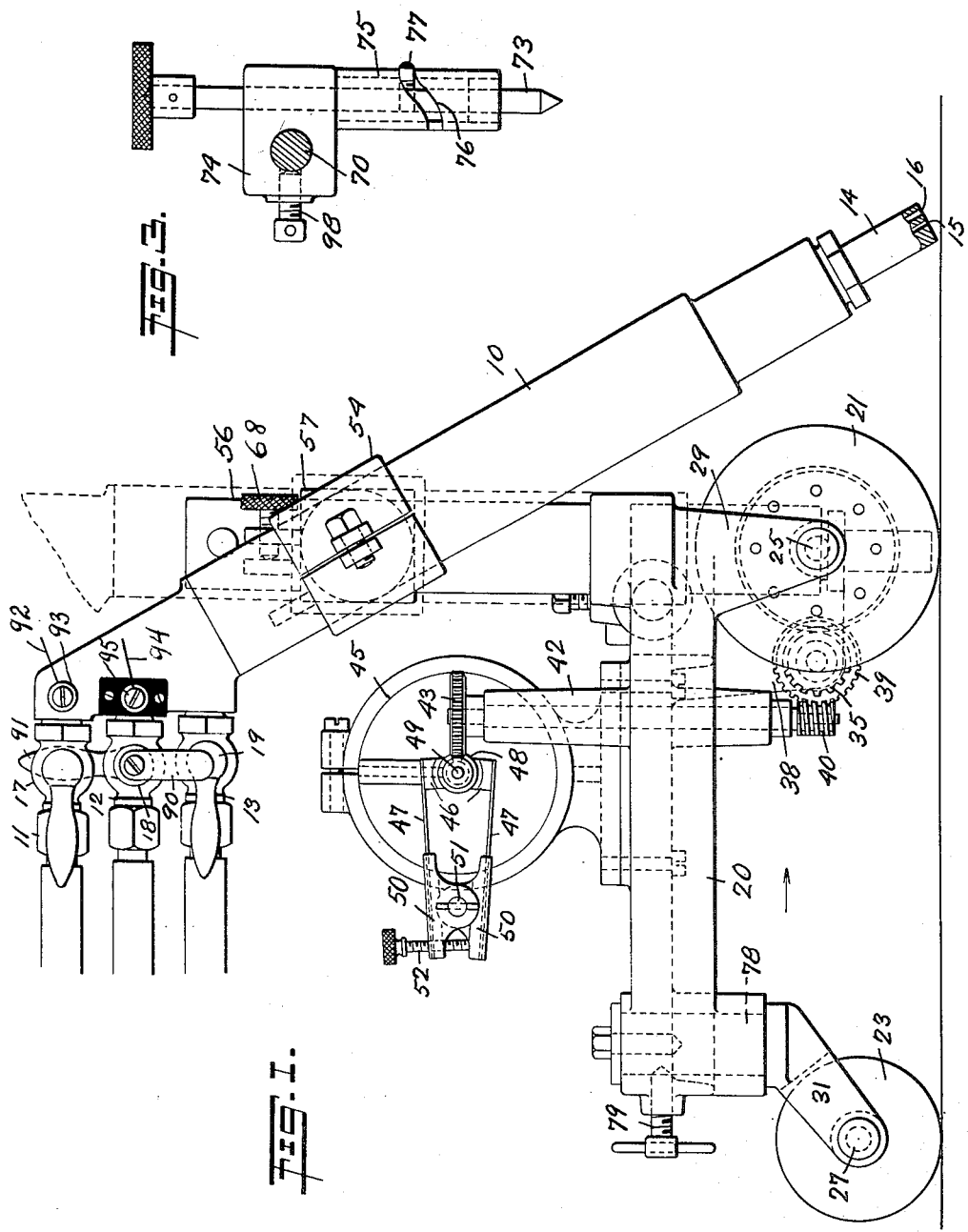

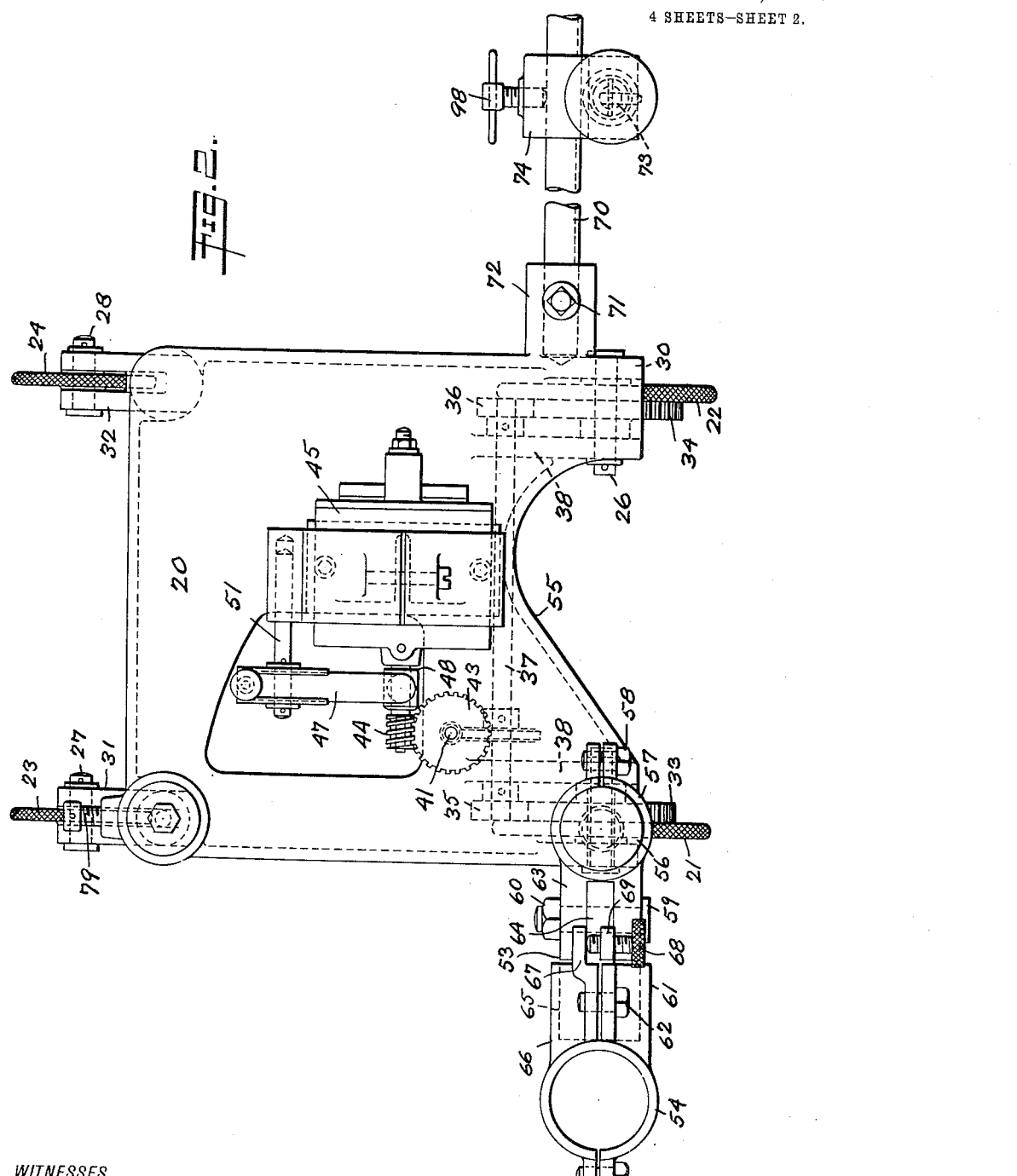

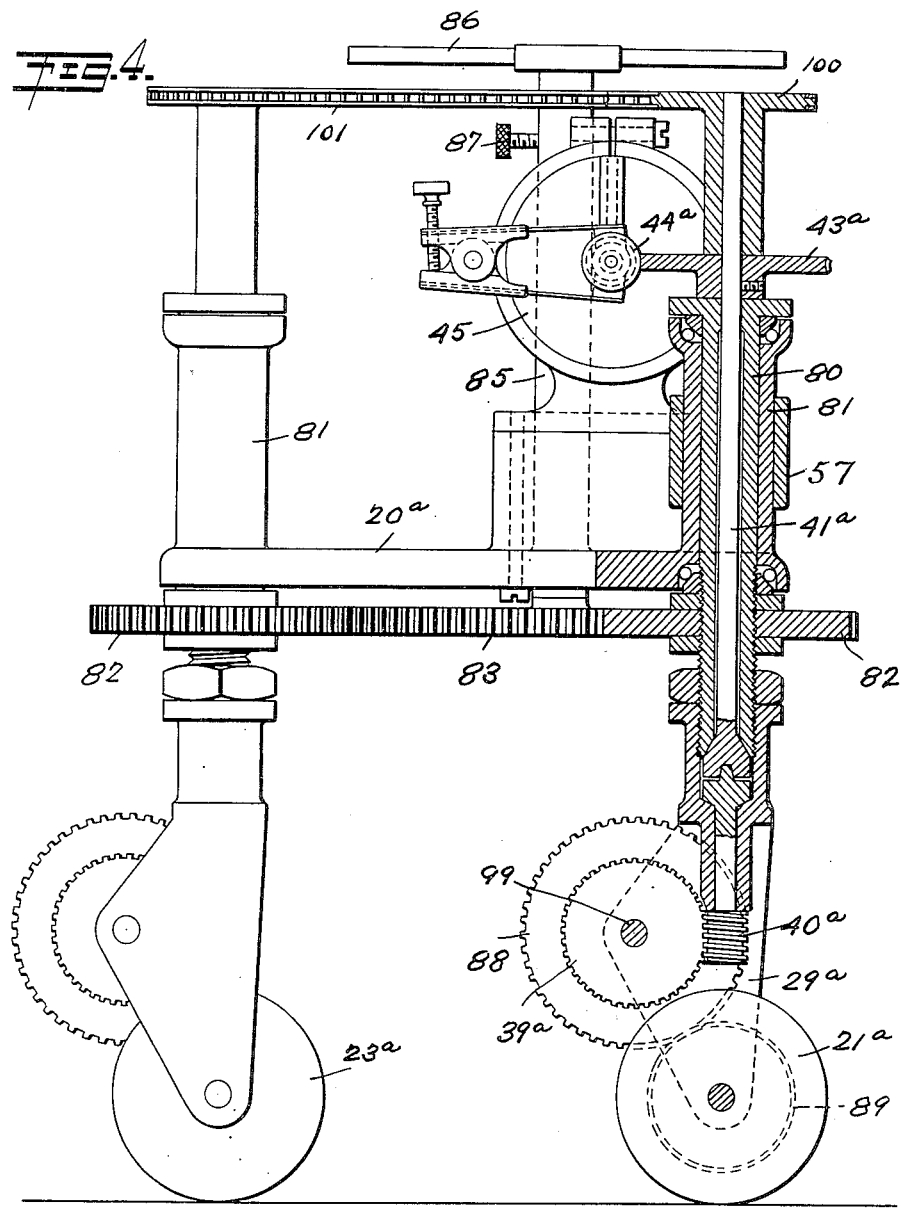

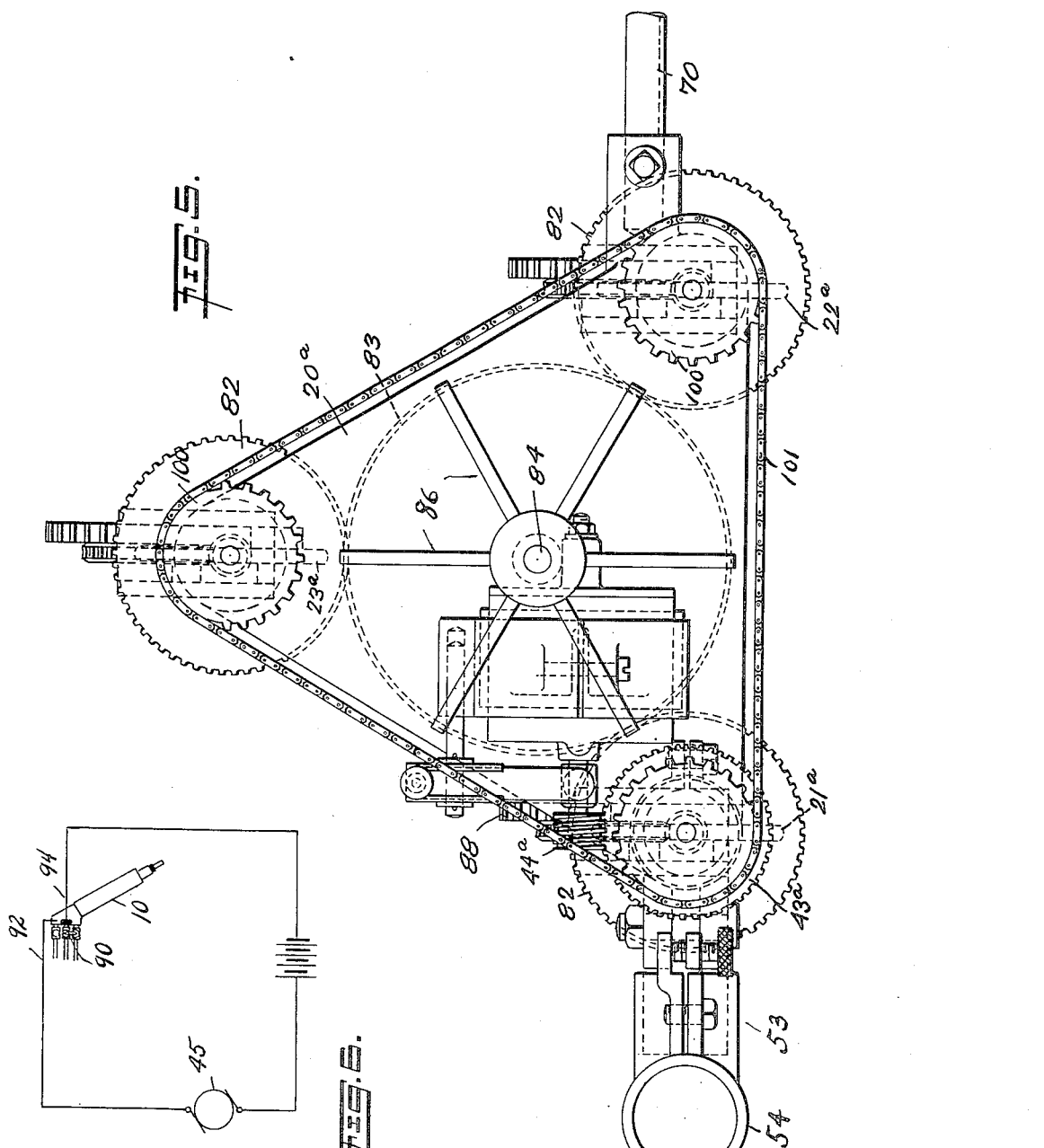

WORTHY C. BUCKNAM, OF JERSEY CITY, NEW JERSEY, ASSIGNOR TO DAVIS-BOURNONVILLE COMPANY, OF NEW YORK, N. Y., A CORPORATION OF NEW YORK.

BLOWPIPE APPARATUS.

1,118,183.

Specification of Letters Patent. Patented Nov. 24, 1914.

Application filed February 11, 1913. Serial No. 747,681.

*To all whom it may concern:*

Be it known that I, WORTHY C. BUCKNAM, a citizen of the United States, and a resident of Marion, Jersey City, in the county of Hudson and State of New Jersey, have invented certain new and useful Improvements in Blowpipe Apparatus, of which the following is a specification.

This invention relates to oxy-acetylene, oxyhydrogen or similar blowpipe apparatus for cutting and welding metals.

One of the objects of the present invention is to provide a simple, portable device, requiring no special means of support, for carrying and mechanically propelling the jet-delivering means over the work at uniform predetermined speed, and along straight or curved lines.

A further object is to secure exact regulation of the relative speed of the jets and work in the direction of the cut.

Another object is, in a power-driven cutting apparatus, to economize the cutting oxygen, by providing means whereby the relative travel between the jets and the work to produce the cut is commenced as soon as the cutting oxygen is turned on and whereby the oxygen is cut off as soon as the relative travel is stopped. This feature is applicable to any power-driven gas cutting apparatus.

A further object is to provide means, readily and accurately controllable by the operator, whereby the torch or jets can be angularly advanced during the relative travel, so as to cut through the lower corner of metal at the end of the cut.

Still another object is to provide means for adjusting the jet-delivering means so as to produce either vertical or beveled cuts.

In the accompanying drawings illustrating the invention: Figure 1 is a side view of the jet-bearing carriage represented as traveling on the surface of a sheet or plate. The cutting torch or blowpipe is shown in full lines angularly tilted or advanced to a greater degree than would be used in practice, for the sake of showing the parts clearly, dotted lines being used to illustrate the normal vertical position of the torch; Fig. 2 is a plan view, the radius arm being broken away to economize space and the torch being removed; Fig. 3 is a detail view illustrating the center and its manner of mounting; Fig. 4 is a side elevation, with parts in vertical section, showing another form of carriage; Fig. 5 is a plan view of the same; and Fig. 6 is a diagrammatic view illustrating the coördinated power and gas control.

The apparatus is designed primarily for cutting, which, as is well known, is performed by an oxygen jet, which rapidly oxidizes the metal along the desired line of cut, being assisted in this action by one or more heating jets or small flames of a combustible mixture, such as acetylene and oxygen, which raise the metal locally to a high temperature so that the oxygen jet can take effect. The apparatus can be used for welding, however, in which case the blowpipe would simply deliver an oxy-acetylene or oxyhydrogen or similar flame suitable for autogenous welding.

The torch or jet-delivering means is moved about over the work by a small, portable, self-supporting wheeled carriage adapted to travel directly on the surface of the latter and having driving wheels with mechanical driving means geared thereto, so that the carriage can move about freely on a sheet or plate to be cut. The jet-delivering means may be of any suitable character, though by preference I employ a removable and replaceable cutting torch 10 of standard construction. The construction of such torches is well known in the art and requires no special description. My prior Patents 1,044,741 of November 19, 1912 and 1,049,807 of January 17, 1913 show suitable constructions. The present torch is shown as having three connections 11, 12, 13 at the rear or upper end for attachment of flexible hose leading from suitable sources of supply and leading, respectively, oxygen for the heating jet or jets, oxygen for the cutting jet, and acetylene for the heating jet or jets. It will be understood that other gas may be used in place of acetylene. The heating and cutting jets are delivered through a nozzle or tip 14, the cutting jet orifice being indicated at 15 and a heating jet orifice at 16. Where a single heating jet is employed it is located in advance of the cutting jet, relatively to the direction of cut; if more than one heating jet is employed they can be disposed in any manner to secure the best heating effect. The cutting oxygen proceeds straight through the torch and emerges at the orifice 15, while the oxygen and acetylene for heating are caused by customary provisions to mix in the torch before leaving the tip. The flow of the gases can be turned on and off by suitable valves 17, 18, 19. While three hose connections are shown, it will be understood that a "two-hose" torch, such as shown in my Patent 1,044,741 before referred to, would be equally suitable, in which event only a single oxygen supply is used, the flow of oxygen being divided after entering the torch, part going to the cutting jet and part to the heating jet or jets. Furthermore, while the heating and cutting streams are preferably delivered from a single nozzle, it will be obvious that separate nozzles could be employed.

The carriage is illustrated in two forms in Figs. 1 and 2, and 3 and 4, respectively. In the first construction the carriage has a platform or body 20 supported on four wheels 21, 22, 23, 24, though three wheels would be sufficient to render the device self-supporting, as shown in Figs. 4 and 5. The wheels 21, 22 are driving wheels, and they are preferably the leading wheels. The wheels 23, 24 follow directly after them. The wheels are mounted to turn on shafts 25, 26, 27, 28, which are carried by bifurcated bearings 29, 30, 31, 32 that project downward from the platform. The structure constitutes a rigid carriage which is adapted to travel accurately in a straight line over a plane surface without guiding means. The wheels are knurled or milled on their peripheries, as indicated, so as to secure proper traction.

The driving wheels 21, 22 have gears 33, 34 fixed to them and meshed by pinions 35, 36 fixed to a transverse shaft 37 journaled in suitable bearings 38. This shaft carries a worm wheel 39, which is driven by a worm 40, on a vertical shaft 41 journaled in a bearing 42 and having a worm wheel 43 at its upper end, which in turn is driven by a worm 44 on the armature shaft of a small electric motor 45 mounted on the platform. This mechanism constitutes the preferred form of mechanical drive, but other forms of mechanical drive may be employed. Driving from an electric motor mounted on a freely-movable wheeled carriage that carries the torch is especially desirable, since the apparatus constitutes a unitary device only requiring to be connected with an external supply circuit in order to be in readiness for operation. Moreover, the only external connections are flexible electric wires, and the movement of the carriage can be instantly started and stopped by merely throwing a switch.

In both welding and cutting the rate of relative travel between the jets and the work is an important factor, and for best results the speed should be uniform during any particular operation. For any particular set of conditions, such as character and thickness of metal, size and velocity of the gas streams, etc., an appropriate rate of travel can be ascertained which will give best results. Consequently a mechanical drive which permits the jets to be propelled relatively to the work, or vice-versa, steadily and at exactly controllable speed, is of great value. For small, traveling, torch-bearing apparatus of the general character illustrated herewith I have devised a special form of controllable drive including an electric motor geared to the drive wheels and an adjustable brake for delicately controlling its speed. In the accompanying drawings I have illustrated such means, in the form of two brake segments 46 of cork or other suitable material, mounted on resilient arms 47 and bearing against a drum 48 on the armature shaft 49. The said arms are fixed to jaws 50, which are pivoted on a stud 51 and are adjustable by means of a screw 52 threaded through one of them and bearing against the other. The force exerted by this screw is transmitted through the spring arms as a yielding pressure on the armature shaft, which can be regulated to a nicety.

The torch 10 is adjustably supported by the carriage through the agency of an arm 53, which at its outer end carries a holder or collar 54 in which the torch is clasped and may be adjusted up and down to position its jet orifices nearer to or farther from the surface of the work. The arm is mounted so as to be capable of swinging about a vertical axis, so that the torch may be supported at a distance from the side of the carriage, as indicated in Fig. 2, or at any point on the arc of movement where it will not intersect the platform. Preferably the platform is recessed at the forward end, as shown at 55, so that the torch can be positioned at 180° from the position indicated in Fig. 2. This movability of the torch-supporting arm relatively to the carriage is of great value in enabling the torch to operate along the desired line, when it may not be possible or convenient to displace the carriage laterally; and it enables the torch to be disposed ahead of the carriage, so that it can cut to the edge of the plate without bringing the front wheels up to or beyond the edge. Furthermore, it provides means for varying the radii of the circles or arcs that can be cut by the aid of the radius rod and center presently to be described. The support for the torch arm is a cylindrical post 56 rising from one corner of the platform over the center of the driving wheel 21, to which post the arm is secured by a clamp collar 57. By loosening the screw 58 of this collar the arm may be swung about the post as a center, and on tightening it the arm is reliably held in the desired position. The same means enable the arm to be adjusted up and down on the post, which is of value, for example, when the carriage is caused to run on rails or other means of support at a distance above the work, as may be the case in cutting bars or other pieces of metal which do not afford a convenient surface for the carriage to travel on.

Means are also provided for angularly adjusting the torch. Preferably, means are provided for angular adjustment in planes at right angles to each other. Thus, one adjustment enables the torch to be tilted transversely of the line of travel, so that it will make a bevel cut; and the other permits the torch to be tilted forward or backward, so that the jets can be inclined ahead, or even to the rear. In the particular construction shown, the arm 53 has two rotatable joints. The axis of one of them is transverse to the arm and the axis of the other is lengthwise of the arm. The first joint is shown as a knuckle joint, indicated at 59, which can be held at any adjustment by its nut 60. The other is shown as a swivel joint, indicated at 61. This joint can be tightened by its screw 62, which draws the edges of the split collar 66 together. Both joints can be constructed so as to be frictionally self-holding at any position, so that the screw devices will only have to be tightened from time to time to take up wear. The arm as thus constructed comprises three pieces. One consists of the clamp collar 57 and the bifurcated member 63 of the knuckle joint. The intermediate section comprises the complementary member 64 of the knuckle joint and a cylindrical portion 65 formed integral with it and constituting the pivot member of the swivel joint; and the outer section comprises the torch-holding collar 54 and the split collar 66 forming the outer member of the swivel joint. In the position shown in Fig. 2, the knuckle joint enables the torch to be tilted transversely of the line of travel, so that the oxygen jet can cut on a bevel when desired, while the swivel joint enables the torch to be tilted in the plane of the cut so that the jets may be angularly advanced. Fig. 1 illustrates an exaggerated degree of tilt effected by virtue of the swivel joint.

Mechanical means are provided whereby the angular advance of the jets by tilting the torch in the vertical plane of the cut can be produced conveniently and with precision during the relative travel between the jets and the work. To this end the collar 66 of the swivel joint is shown as provided with a lug 67 forming an abutment, against which a screw 68 threaded through a lug 69 formed integral with the member 64 is adapted to bear. The screw 68 has a circular knurled head, by means of which it can conveniently be operated. By turning the screw so that it presses rearward against the lug 67 the tip or jet-delivering portion of the torch is tilted forward, and this can be done gradually as the torch approaches the far end of the cut, so as to reduce the likelihood of the lower corner of metal escaping the action of the cutting jet.

Means are provided whereby the carriage can be guided to cut circles or circular arcs. To this end I employ a center and a radius arm, whereby the carriage can be compelled to travel about the center when desired. By preference these parts are mounted on the carriage, and means are provided whereby the center may be brought into engagement with the work, the near wheels being elevated above the work surface, so that the carriage travels on the two outer wheels. To this end the radius rod 70 is held by a set screw 71 in a socket 72 at the side of the carriage remote from the support of the torch-bearing arm. This radius rod extends horizontally to a suitable distance and the center 73 may be adjusted along it to vary the radius. For this purpose the center is mounted in a slide 74 which may be set at any point on the rod by a screw 98. The center is movable longitudinally and also rotatable in bearings in the slide 74 and in a downward-projecting sleeve 75 fixed thereto; and this sleeve has a cam slot 76 in which operates a radial pin 77 on the center, the ends of the slot being formed to hold the pin in either up or down position. The center is normally supported slightly above the surface of the work, and turning it by means of the knurled head on its upper end moves it downward against the work, and by reaction lifts the near wheels 22, 24 a slight distance into the air. In order that the center may engage the work securely, a depression is preferably provided for it by means of a punch.

To facilitate the circular movement of the carriage about the center, the rear outer wheel 23 is mounted so as to be capable of acting like a caster. To this end its bearing is of caster formation and has a spindle 78, which is capable of swiveling in the platform though normally held against turning by a set screw 79. When the device is to be used for cutting circles or arcs this set screw is loosened; otherwise it is screwed up so that its point engages a recess in the side of the spindle so as to hold it from turning. The center 73 is preferably located opposite the center of the driving wheel 21, and is also in line with the center of the post 56 and with the center of the torch when the torch-bearing arm is in the position shown in Fig. 2, or in the position at 180° when the torch is disposed in the recess 55.

The apparatus described is especially adapted for traveling directly on the surface of the work, such as sheets or plates. Obviously, however, it can run on simple grooved tracks whenever this may be preferable. Thus, tracks may be laid on the work so as to project at both sides thereof, thus enabling the carriage to start from a position in advance of one edge of the plate to be cut and to run beyond the far edge. The device may be used for elliptical openings, or, rather, oblong openings with rounded ends, by allowing it to travel along a straight line for a distance corresponding to the length of one straight side, then arresting this movement, depressing the center so as to raise the inner wheels 22 and 24, starting the motor again so that the torch cuts on a semicircle, and thereafter stopping this movement and raising the center so that the machine can travel on a straight line parallel to the other. When the second straight side is completed, the other circular end is cut in the same manner as the first.

Figs. 4 and 5 show a form of the invention designed to travel directly on the work and capable of changing its course in any direction. The platform 20ª is here shown of triangular shape and provided with three supporting wheels 21ª, 22ª, 23ª. All of the wheels have vertical spindles, such as shown at 80 in Fig. 4, which are mounted to turn in vertical bearings 81. Fixed to each of the spindles is a gear 82, which meshes with a central gear 83 that is mounted on a vertical shaft 84 journaled in a bearing 85. On the upper end of the shaft 84 are radiating arms 86, constituting handles, whereby the gear may be conveniently turned to steer the carriage. This gearing, and the handles for operating it, constitute an embodiment of means for turning all of the wheels to one side or the other, so as to change the course of the carriage. The steering mechanism may be locked against movement when desired by means of a set screw 87, which is threaded through the bearing 85 so as to be capable of bearing against the shaft 84. The wheel 21ª is driven by the motor 45 mounted on the platform, the motor shaft being provided with a worm 44ª which meshes with a worm wheel 43ª on the upper part of a shaft 41ª, which passes axially through the spindle 80. On the lower end of the shaft 41ª, which may be formed in sections, is a worm 40ª, which meshes with a worm wheel 39ª fixed to a spur-gear 88 meshing with a gear 89 fixed to the wheel 21ª. The gears 39ª and 88 are mounted on a shaft 99, which is carried by the bifurcated bearing 29ª of the wheel 21ª, and this bearing has fixed to it the vertical spindle 80. The concentric arrangement of the shaft 41ª and the spindle 80, which serves as a bearing for this shaft, enables the motor to drive the wheel 21ª irrespective of the operation of the steering mechanism. Preferably two or all of the wheels are driven simultaneously and equally. To this end each of the wheels is mounted and provided with drive mechanism in the same manner as the wheel 21ª, and the several drive shafts 41ª, rotatable in the sleeve spindles 80 carrying the wheels, are provided with sprocket wheels 100, connected by a sprocket chain 101. Thus the motor drives all the wheels simultaneously. In this form of the device the torch is supported in the same manner as in Figs. 1 and 2, except that the split clamp 57 encircles one of the tubular bearings 81 in place of the post 56. In operation this form of the invention can be used to cut along any desired irregular curves or angular lines, or the steering mechanism may be locked so that the device can travel in a straight line only. The handles 86 enable the operator to change the course of the carriage easily and quickly. A radius rod 70 and center may be used with this form of apparatus, if desired, but by marking a circle on the work the carriage can be guided by hand to follow it quite accurately. If at any time one or more of the wheels should be on the point of rolling into or over a portion of the cut already made, the gap can be bridged by putting down a piece of tin or other thin sheet metal for the wheel or wheels to run on.

As illustrated more particularly in Figs. 1 and 6, the controls of the cutting oxygen and of the power for driving the carriage and thereby producing relative movement between the jets and the work are combined. In the present instance this is accomplished by attaching a switch 90 to the end of the valve 18, by which the cutting oxygen supply is turned on and off. Consequently this switch is turned simultaneously with the valve when the valve handle 91 is moved. This switch opens and closes the motor circuit, as indicated diagrammatically in Fig. 6. One terminal 92 of this circuit is secured to a binding post 93 on the torch, and the other terminal 94 is secured to a contact 95 mounted on but insulated from the torch. When the cutting oxygen valve is closed, this being the position indicated in Fig. 1, the switch arm 90 does not touch the contact 95, but when the handle 91 is moved through 90° so as to open the conduit the arm rests on the contact 95 and thereby closes the circuit. Thus, the cutting oxygen and the power for driving the torch are turned on simultaneously and waste of the oxygen is avoided. The stopping of the carriage and the cutting off of the oxygen are also simultaneous. Before opening the cutting oxygen valve the acetylene valve 19 is opened, and the acetylene emerging from the heating jet orifice or orifices is lighted. The heating oxygen valve 17 is then turned on to combine with the acetylene to produce the oxy-acetylene heating flame or jet. When the heating flame has played upon the metal for a time, so as to raise the starting point to the proper temperature, the oxygen valve 18 is opened and the relative movement between the jets and the work in the direction of the line of cut begins. Fig. 1 represents the valves 17 and 19 open and valve 18 closed.

What is claimed as new is:

1. A self-contained, mechanically-propelled gas cutting apparatus, portable and adapted to travel in any desired direction on various underlying surfaces, the same comprising jet-delivering means mounted on a portable, self-supporting carriage having three or more rolling supports movable on the surface of the work or other underlying surface, and also carrying means for mechanically propelling it and the jets so as to advance the cut at uniform speed.

2. A portable, self-contained, mechanically-propelled gas cutting apparatus, comprising a portable, self-supporting wheeled carriage adapted to travel on various underlying surfaces, jet-delivering means thereon, and an electric motor also mounted on the carriage and geared to one or more of its wheels so as to advance the cut at uniform relatively slow speed.

3. A portable, self-contained, mechanically-propelled gas cutting apparatus, comprising a portable, self-supporting wheeled carriage adapted to travel on various underlying surfaces, jet-delivering means thereon, mechanical driving means including an electric motor also mounted on the carriage for propelling it and the jets so as to advance the cut at uniform speed, and adjustable frictional resistance means for exactly varying the speed of such advance.

4. In a gas cutting apparatus, the combination of suitable jet-delivering means, a wheeled traveling member for moving the same over the work to advance the cut, a motor carried by said member and geared to a wheel thereof to drive the same at uniform speed, and an adjustable braking device for exactly varying the speed at which the motor advances the cut.

5. In a gas cutting apparatus, the combination of suitable jet-delivering means, means including an electric motor for mechanically propelling the same at uniform speed, and an adjustable mechanical resistance for exactly varying the speed at which the motor advances the cut.

6. A self-contained, mechanically-propelled gas cutting apparatus, portable and adapted to travel in straight or curved lines on various underlying surfaces, the same comprising jet-delivering means mounted on a portable, self-supporting carriage having three or more rolling supports movable on the surface of the work or other underlying surface, and also carrying means for mechanically propelling it and the jets so as to advance the cut at uniform speed, in combination with a radius arm and center for confining the carriage to circular movement when desired.

7. A self-contained, mechanically-propelled gas cutting apparatus, portable and adapted to travel in straight or curved lines on various underlying surfaces, the same comprising jet-delivering means mounted on a portable, self-supporting carriage having three or more rolling supports movable on the surface of the work or other underlying surface, and also carrying means for mechanically propelling it and the jets so as to advance the cut at uniform speed, in combination with a radius arm and center carried by the carriage, and means for bringing the center into engagement with the work when desired.

8. Apparatus of the character described, comprising jet-delivering means, a self-supporting wheeled carriage therefor, mechanism for driving the carriage, a center carried by the carriage at one side, and means for projecting said center downward so as to raise the near wheel or wheels and cause the carriage to travel in a circle on the remaining wheels.

9. Apparatus of the character described, comprising jet-delivering means, a self-supporting wheeled carriage therefor, mechanism for driving the carriage, a center carried by the carriage at one side, and means whereby the near wheel or wheels are raised when the center is engaged with the work.

10. Apparatus of the character described, comprising jet-delivering means, a self-supporting wheeled carriage therefor, mechanism for driving the carriage, a center carried by the carriage at one side, and means whereby the rear wheel or wheels are raised when the center is engaged with the work, of the remaining wheels one being a driving wheel and the other having a swivel mounting and means whereby it may be held against swiveling or free to swivel.

11. Apparatus of the character described, comprising a self-supporting carriage with rolling supports, mechanism thereon for applying power to drive the same, an arm mounted on said carriage to swing relatively to the carriage in a horizontal plane, and a torch carried by said arm.

12. Apparatus of the character described, comprising a mechanically driven carriage with rolling supports, an arm mounted on said carriage to swing in a horizontal plane and having a joint whereby its outer part may be tilted up and down, and means on said outer part for holding a torch.

13. Apparatus of the character described, comprising a mechanically driven carriage with rolling supports, an arm mounted on said carriage to swing in a horizontal plane and having a joint whereby its outer part may be tilted up and down, and a torch holder swiveled on said outer part.

14. Apparatus of the character described, comprising a mechanically driven self-supporting carriage with rolling supports, a torch, and a structure supporting the same from the carriage and enabling angular adjustment of the torch fore and aft and also angular adjustment thereof laterally.

15. Apparatus of the character described, comprising a mechanically driven self-supporting carriage with rolling supports, a torch, and an arm adapted to support the torch at the side of the carriage and mounted to be capable of swinging the torch around to one end of the same.

16. Apparatus of the character described, comprising a cutting torch, a mechanically driven part carrying the same, and means for angularly adjusting the torch transversely of the direction of cut and holding it at the desired adjustment so as to tilt the torch transversely of the direction of cutting.

17. Apparatus of the character described, comprising means for delivering heating and oxygen jets, a support for maintaining the same at the appropriate distance from the work, drive mechanism for producing relative travel between said support and the work, and mechanical means for controllably angularly advancing the jet-delivering means.

18. Apparatus of the character described, comprising jet-delivering means, and means for supporting the same at an appropriate distance from the work including joints whereby the jet-delivering means may be tilted in planes perpendicular to the work and at right angles to each other and held in either angular adjustment.

19. In apparatus for cutting metals by means of gases, the combination of means for delivering heating and oxygen jets, a power drive for producing relative movement between the jet-delivering means and the work in the direction of cutting, a valve controlling the oxygen jet, and a power controlling member coördinated with the valve for simultaneous operation.

20. In apparatus for cutting metals by means of gases, the combination of means for delivering heating and oxygen jets, a power drive for producing relative movement between the jet-delivering means and the work in the direction of cutting, a valve controlling the oxygen jet, and a power-controlling device operatively connected with said valve.

21. A self-contained, mechanically-propelled gas cutting apparatus, portable and adapted to travel in any desired direction on various underlying surfaces, the same comprising jet-delivery means mounted on a portable, self-supporting carriage having three or more rolling supports movable on the surface of the work or other underlying surface, and also carrying means for mechanically propelling it and the jets so as to advance the cut at uniform speed, in combination with means on the carriage for steering it in any direction.

22. A self-contained, mechanically-propelled gas cutting apparatus, portable and adapted to travel in any desired direction on various underlying surfaces, the same comprising jet-delivery means mounted on a portable, self-supporting carriage having three or more rolling supports movable on the surface of the work or other underlying surface, and also carrying means for mechanically propelling it and the jets so as to advance the cut at uniform speed, in combination with means for simultaneously steering the rolling supports so as to change the direction of travel.

23. A self-contained, mechanically-propelled gas cutting apparatus, portable and adapted to travel in any desired direction on an underlying surface, the same comprising a carriage mounted on driving wheels and carrying jet-delivering means, and driving means connected with said wheels and mounted on said carriage for mechanically propelling the carriage and the jets so as to advance the cut at uniform speed.

24. A self-contained, self-supporting, mechanically-propelled gas cutting apparatus, portable and adapted to travel in any desired direction on an underlying surface, the same comprising a carriage mounted on three or more wheels and carrying jet-delivering means wholly supported thereby, and a motor and speed regulating means mounted on the carriage and connected with said wheels for propelling the carriage and the jets so as to advance the cut at predetermined uniform speed.

25. A self-contained, self-supporting, mechanically-propelled gas cutting apparatus, portable and adapted to travel in any desired direction on an underlying surface, the same comprising a carriage mounted on three or more wheels, a torch holder on the carriage, a torch removably mounted in said holder and wholly supported by the carriage, and a motor and speed regulating means mounted on the carriage and connected with said wheels for propelling the carriage and the jets so as to advance the cut at predetermined uniform speed.

In witness whereof I have signed my name in the presence of two subscribing witnesses.

WORTHY C. BUCKNAM.

Witnesses:
J. F. BRANDENBURG,
LOUELLA F. LITTLE.